United States Patent
Roll et al.

(10) Patent No.: US 6,435,627 B1
(45) Date of Patent: Aug. 20, 2002

(54) METHOD AND DEVICE FOR DETECTING UNSTABLE BRAKING AND CONTROLLING BRAKING PRESSURE

(75) Inventors: Georg Roll, Heusenstamm; Jürgen Woywod, Mörfelden; Dirk Waldbauer, Eppstein; Wolfgang Kling, Frankfurt, all of (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 09/529,209

(22) PCT Filed: Oct. 16, 1998

(86) PCT No.: PCT/EP98/06563
§ 371 (c)(1),
(2), (4) Date: Jun. 16, 2000

(87) PCT Pub. No.: WO99/20506
PCT Pub. Date: Apr. 29, 1999

(30) Foreign Application Priority Data

Oct. 17, 1997 (DE) .......................................... 197 45 912
Dec. 16, 1997 (DE) .......................................... 197 55 781
Apr. 18, 1998 (DE) .......................................... 198 17 285

(51) Int. Cl.[7] .................................................. B60T 8/72

(52) U.S. Cl. ....................................... 303/173; 303/165

(58) Field of Search ............................ 303/122.01, 139, 303/155, 167, 169, 173, 176, 147, 146, 148, 160, 163, 164, 166, 174, 187; 188/3 H, 153 R; 364/426.016

(56) References Cited

U.S. PATENT DOCUMENTS 4,784,443 A * 11/1988 Weise ........................... 303/96
4,964,045 A * 10/1990 Iwata ..................... 364/426.02
5,230,550 A * 7/1993 Braschel ....................... 303/96
5,345,385 A    9/1994 Zomotor et al. ....... 364/424.05
5,401,081 A * 3/1995 Sakane ........................ 303/103

(List continued on next page.)

FOREIGN PATENT DOCUMENTS

JP     0240287  * 10/1987
JP     0522565  *  1/1993

OTHER PUBLICATIONS

Debes, et al., Dynamic Stability control (DSC) of BMW Series 7–Part 1 ATZ, vol. 99, No. 3 (English translation attached).

*Primary Examiner*—Christopher P. Schwartz
(74) *Attorney, Agent, or Firm*—Rader, Fishman & Grauer PLLC

(57) ABSTRACT

Disclosed is a method for identifying a critical braking operation of a two-track vehicle during cornering, which features the steps of detecting the running behaviour of a left-hand side wheel and of a right-hand side wheel, of comparing the running behaviour and/or of evaluating the time variation of at least one left-hand side wheel or right-hand side wheel, and of identifying a critical braking operation on the basis of the result of the comparison and/or of the result of the evaluation. As a reaction, there may ensue the reduction of the braking pressure of a wheel on the inside of the corner in response to identification. A device for identifying a critical braking operation of a two-track vehicle during cornering includes a detecting device (403a, b, 408a, b) for detecting the running behaviour of a left-hand side wheel and of a right-hand side wheel (301a–d), a first comparing device (409–412) for comparing the running behaviour and/or an evaluating device (404–407) for evaluating the time variation of at least one left-hand side wheel or one right-hand side wheel, and an identifying device (413) for identifying a critical braking operation on the basis of the output of the comparing device and/or of the output of the evaluating device. Moreover, a modifying device (315) can be provided for reducing the braking pressure of a wheel on the inside of the corner in response to identification.

20 Claims, 13 Drawing Sheets

U.S. PATENT DOCUMENTS

| | | | |
|---|---|---|---|
| 5,556,176 A | 9/1996 | Bosch et al. | 303/165 |
| 5,669,677 A | 9/1997 | Fischer | 303/147 |
| 5,682,333 A | 10/1997 | Baumann | 364/565 |
| 5,685,618 A * | 11/1997 | Uchida | 303/146 |
| 5,774,821 A * | 6/1998 | Eckert | 701/78 |
| 5,927,830 A * | 7/1999 | Tozu | 303/155 |
| 5,967,624 A | 10/1999 | Graber et al. | 303/113.4 |
| 6,012,010 A * | 1/2000 | Batistic | 701/72 |
| 6,026,343 A * | 2/2000 | Ogino | 701/72 |
| 6,052,643 A * | 4/2000 | Batistic | 701/72 |
| 6,056,371 A * | 5/2000 | Lin | 303/146 |
| 6,142,587 A * | 11/2000 | Ohtsu | 303/167 |
| 6,155,655 A * | 12/2000 | Matsuno | 303/140 |
| 6,158,274 A | 12/2000 | Guo et al. | 73/118.3 |
| 6,223,115 B1 * | 4/2001 | Batistic | 701/72 |

* cited by examiner

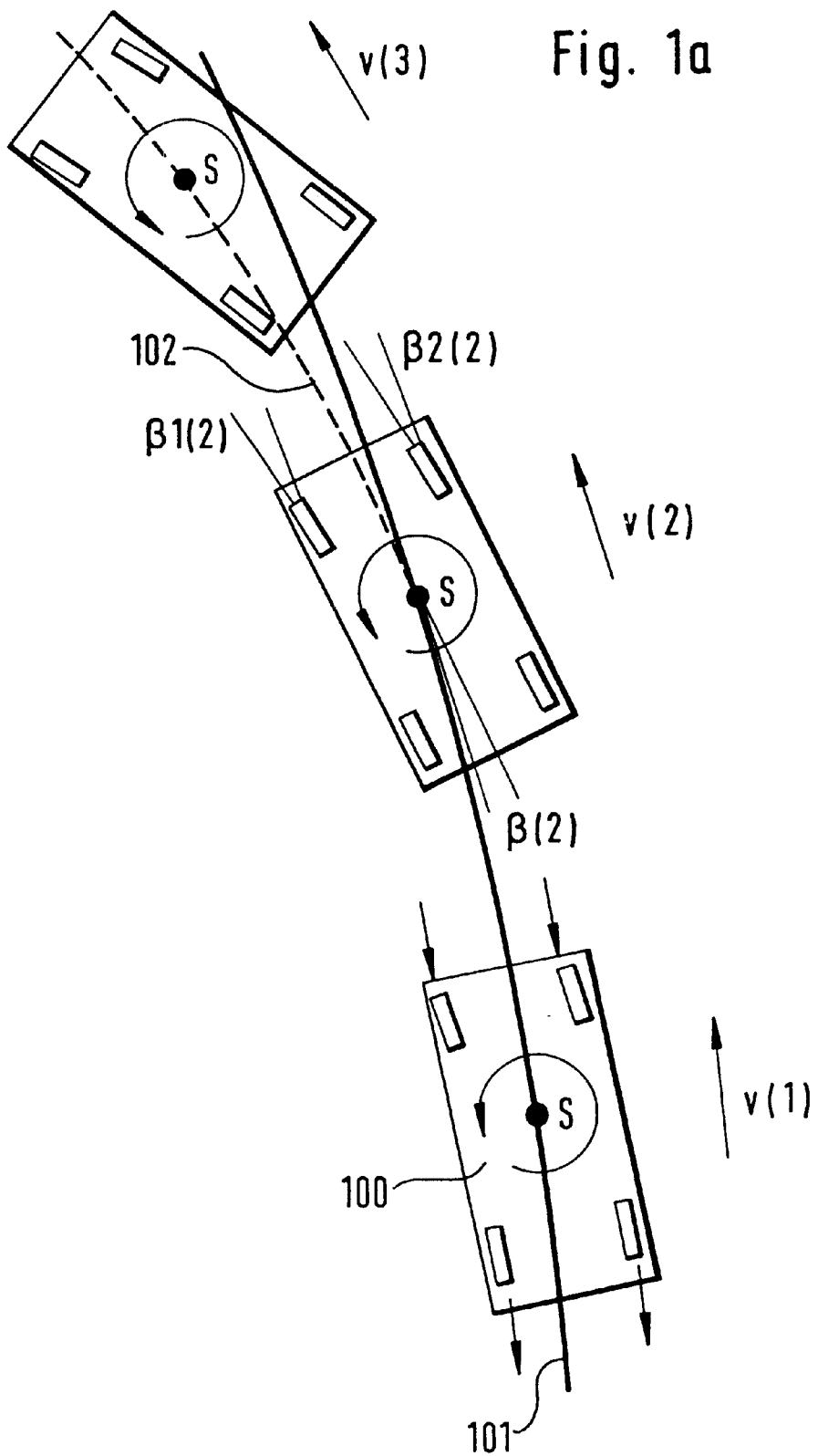

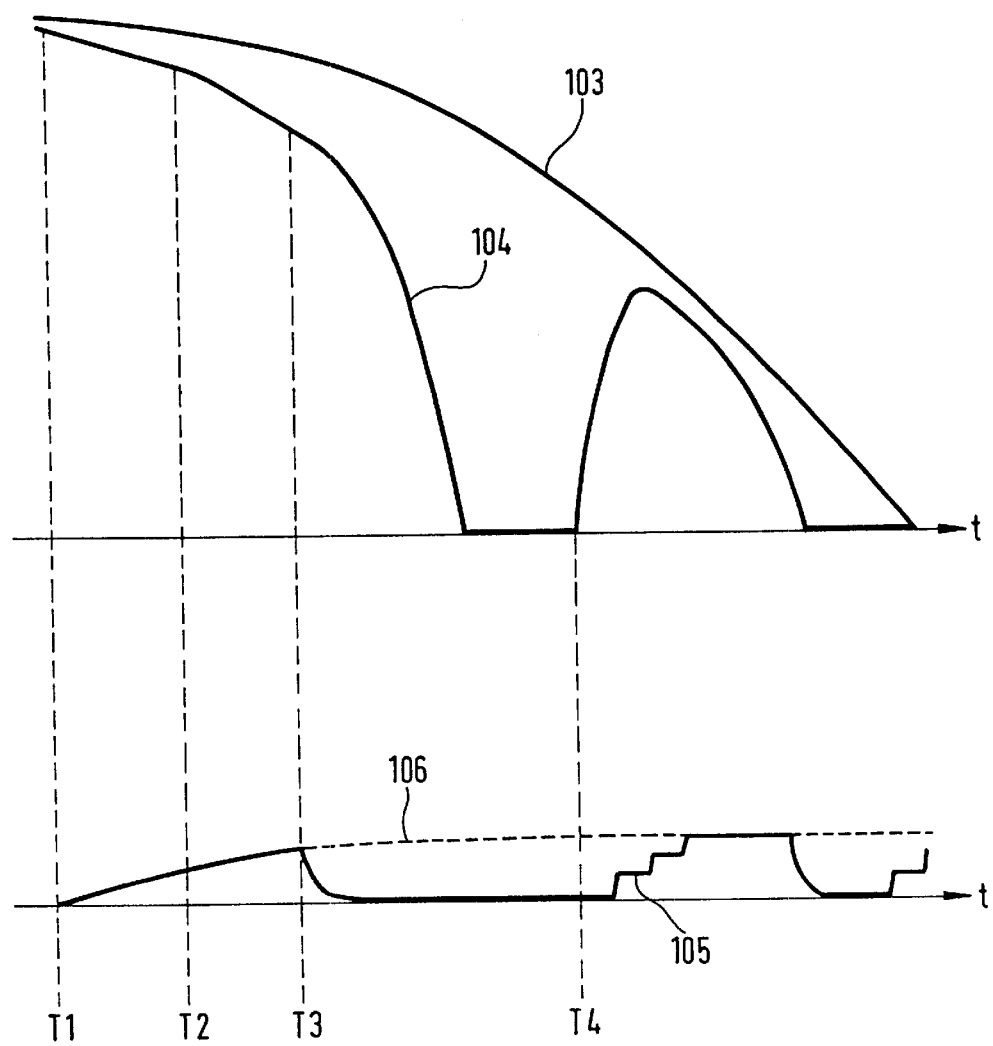

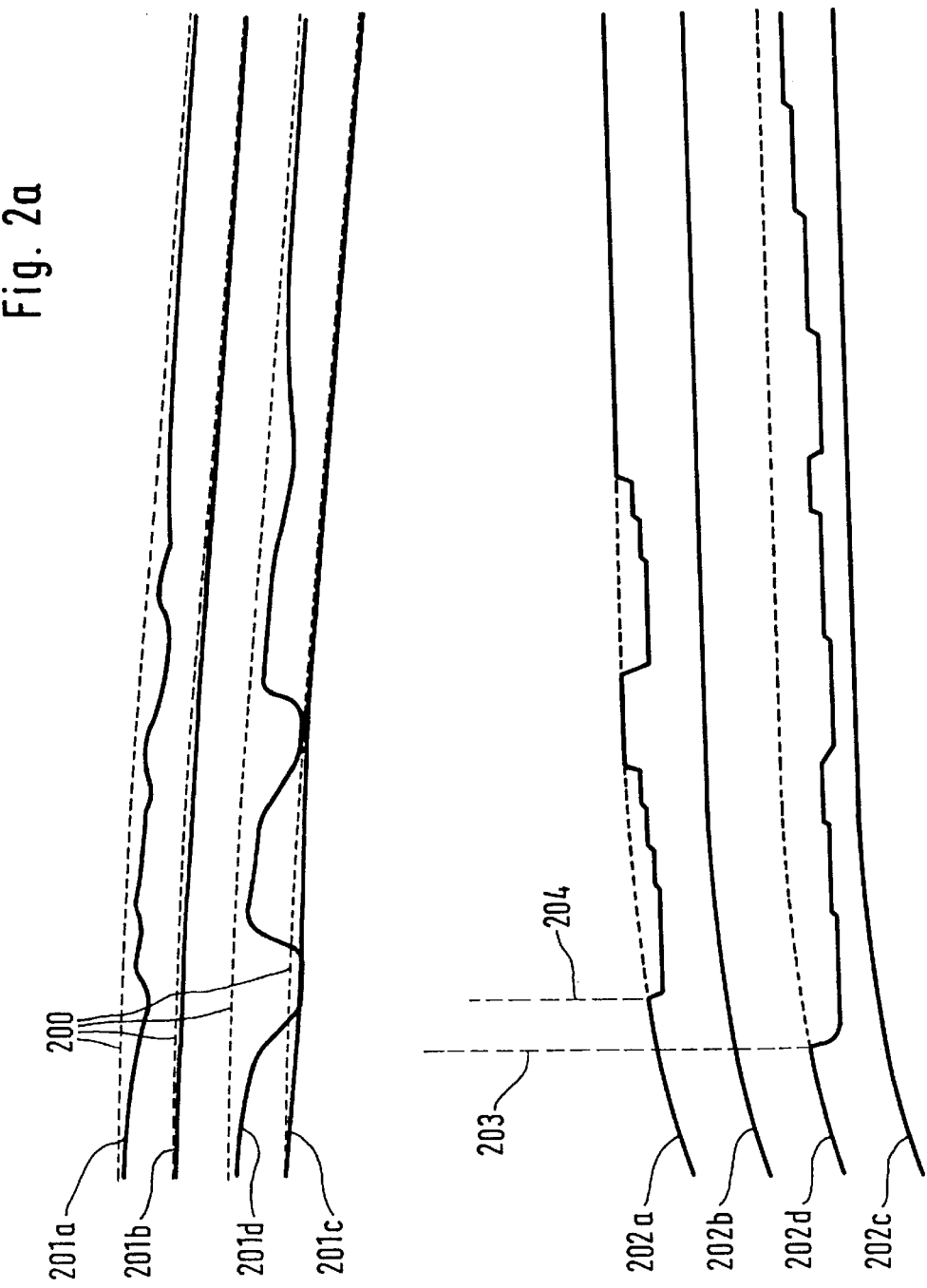

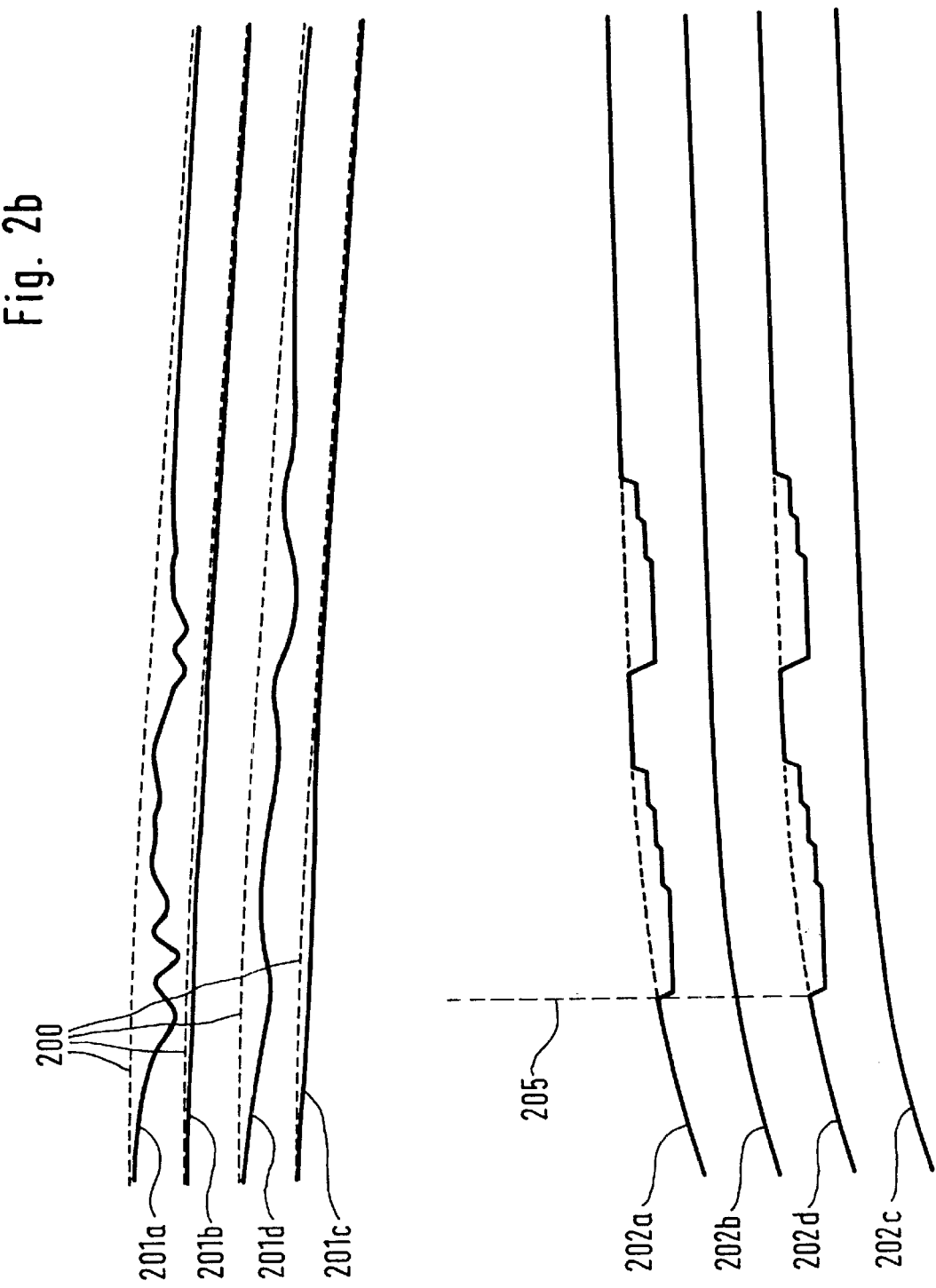

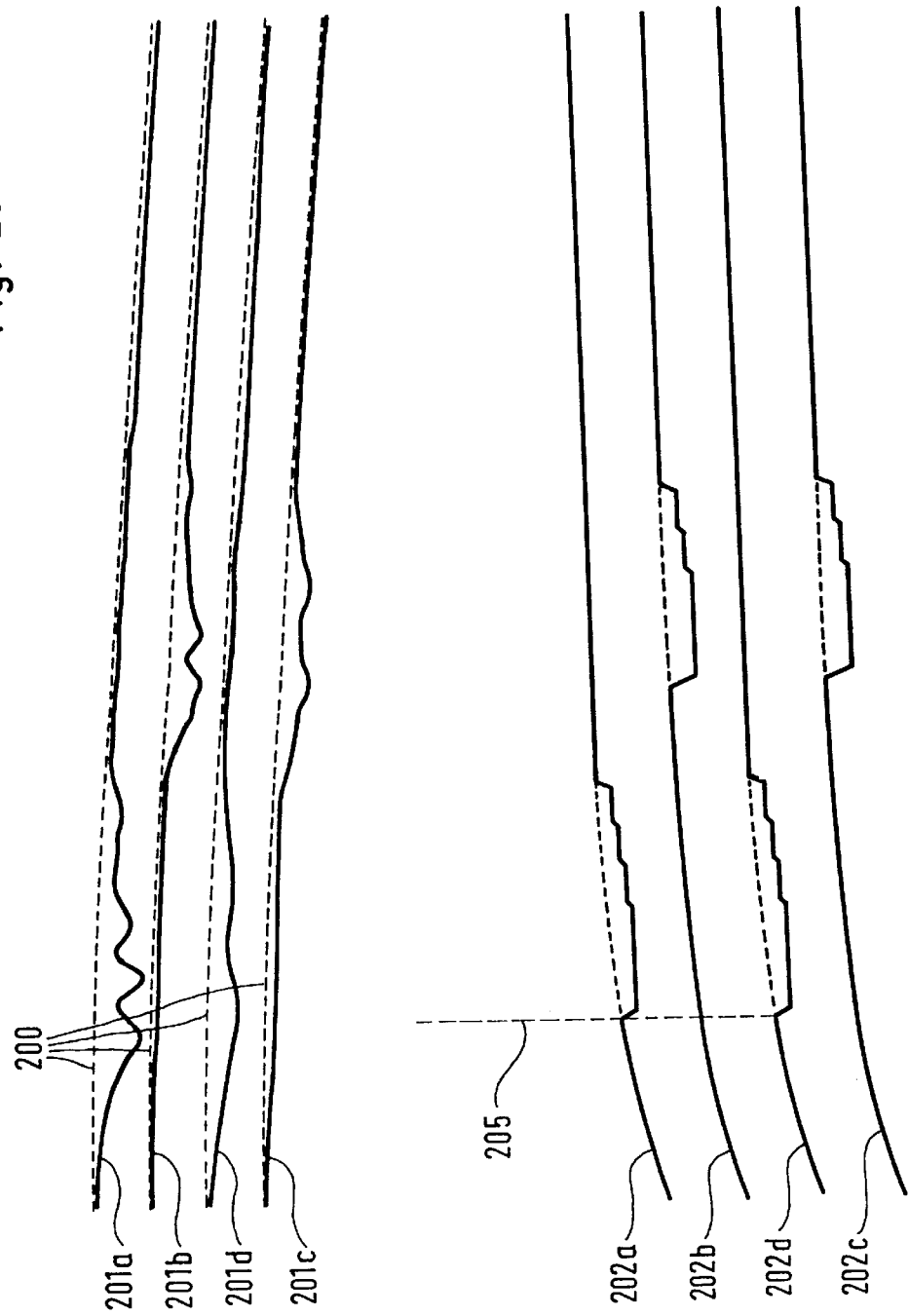

Fig. 3
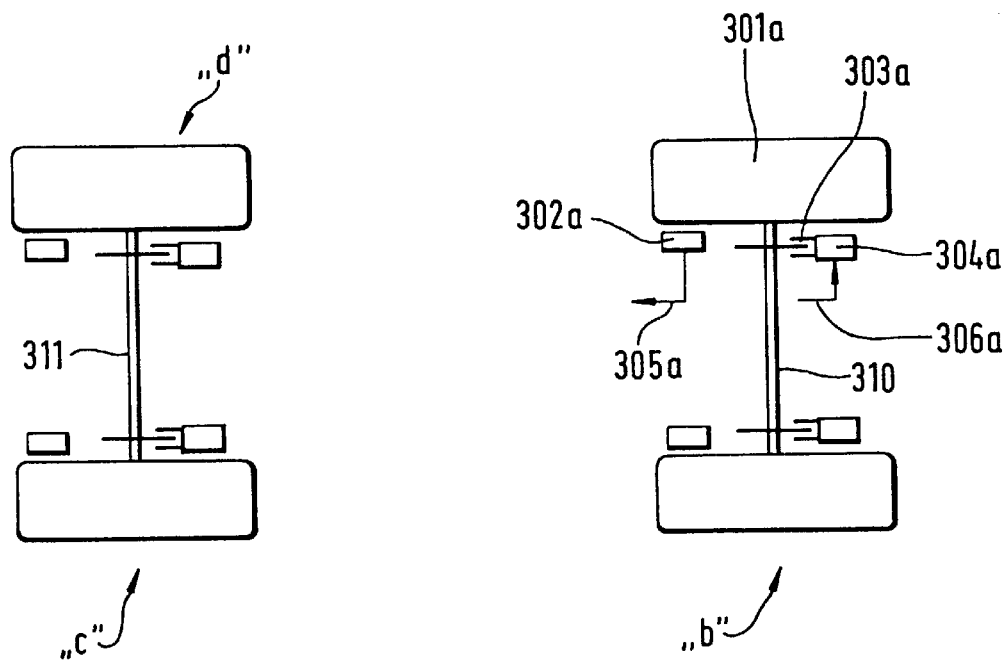
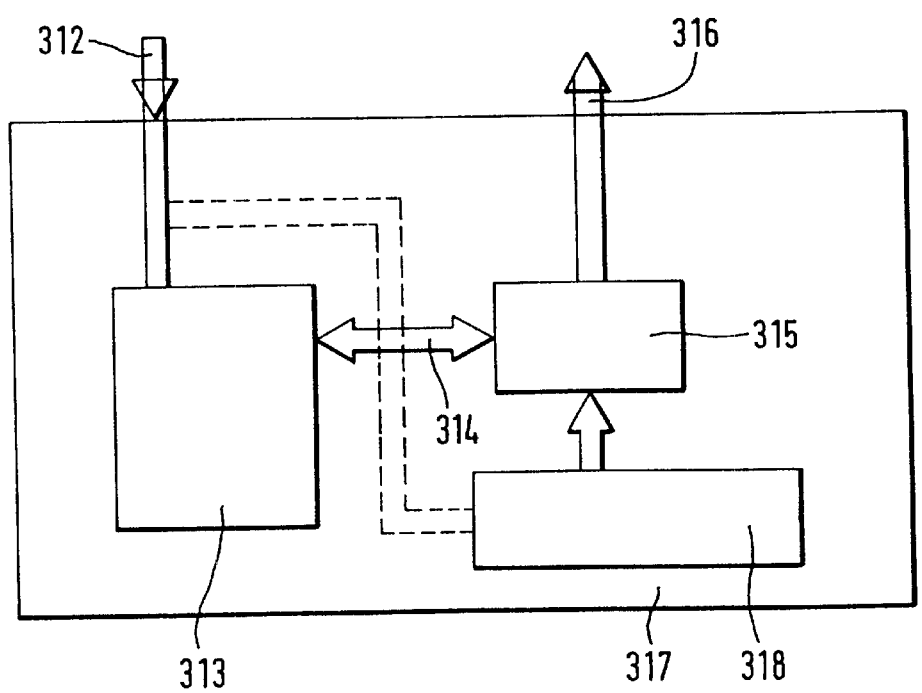

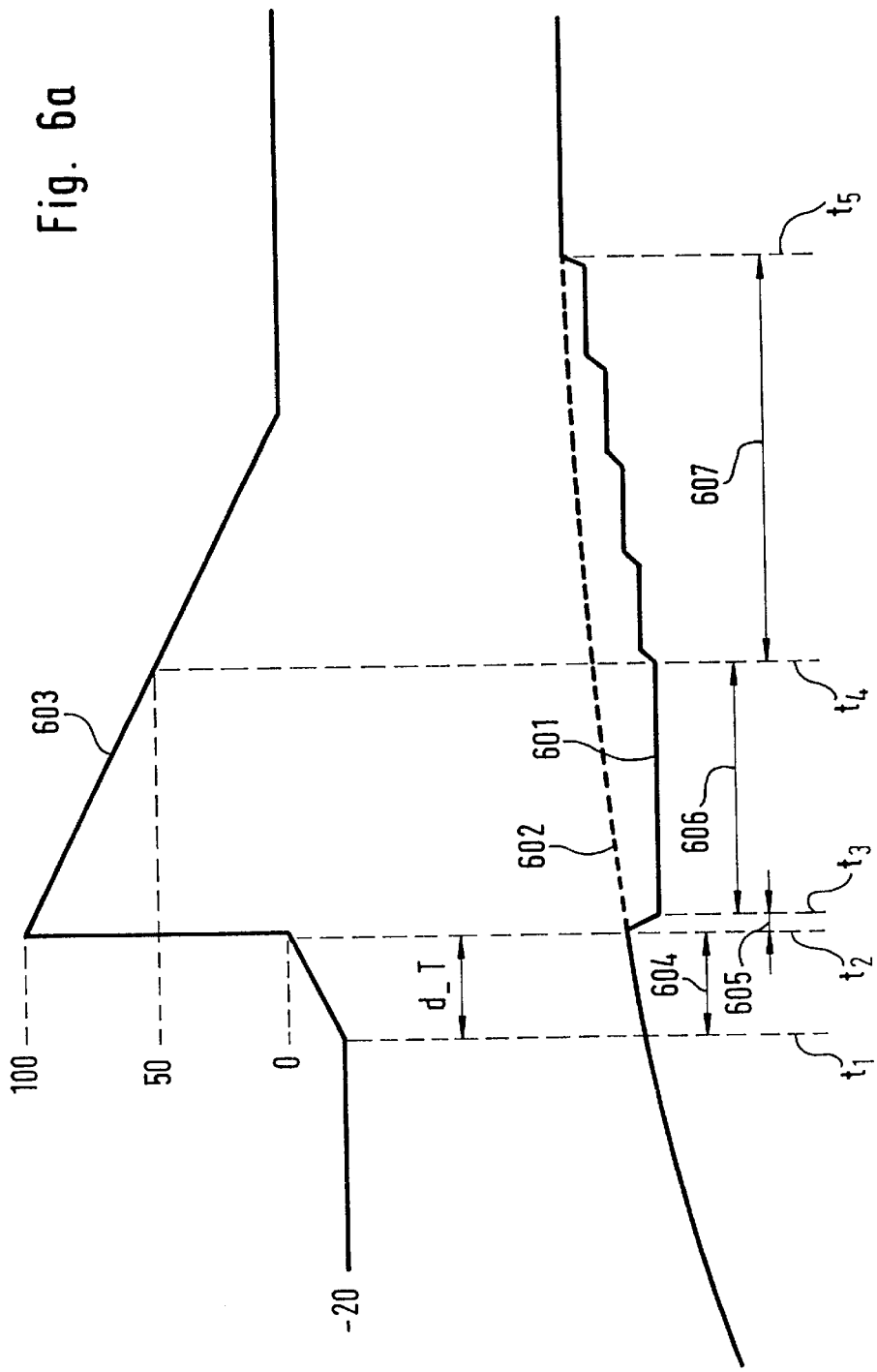

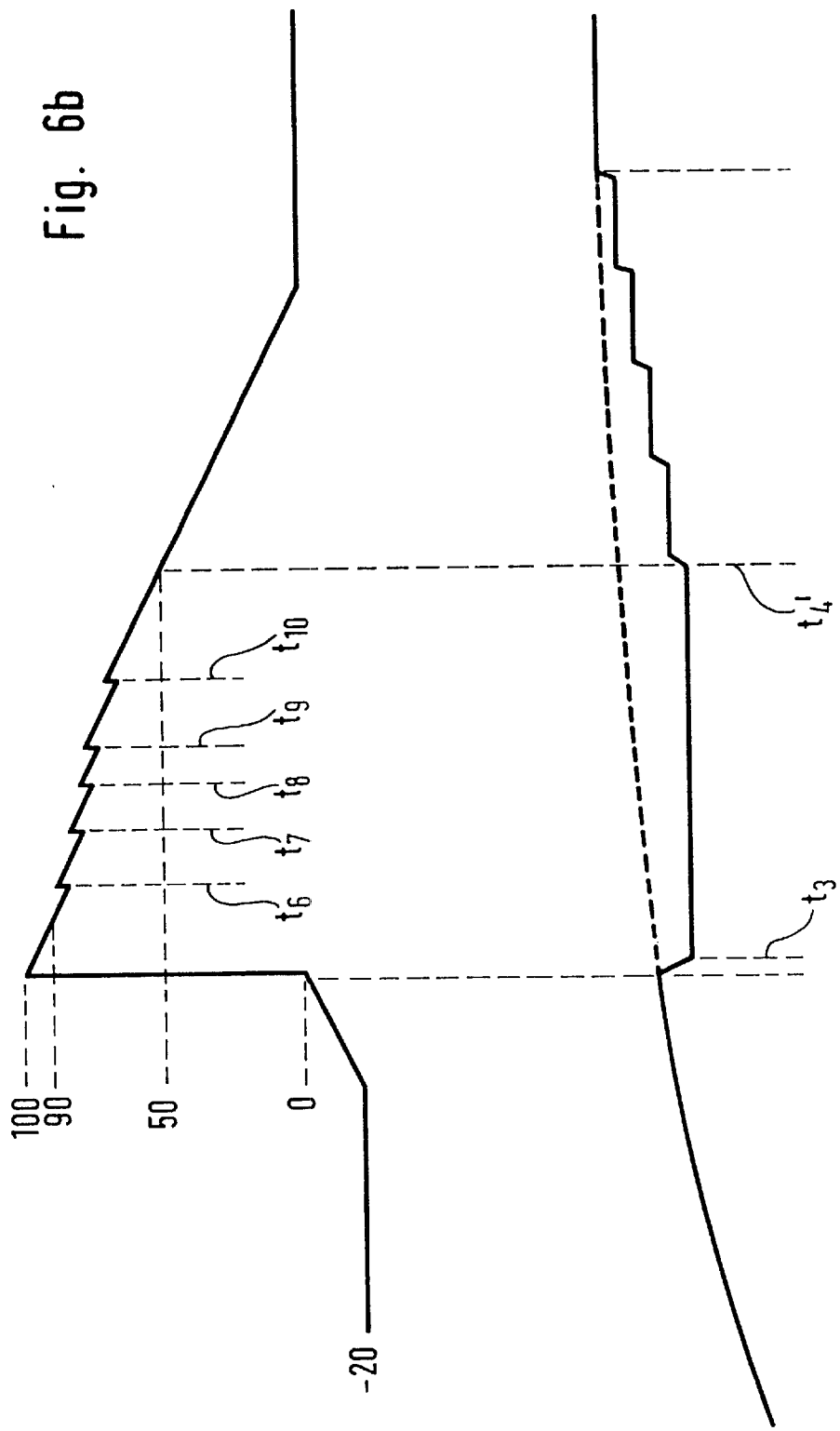

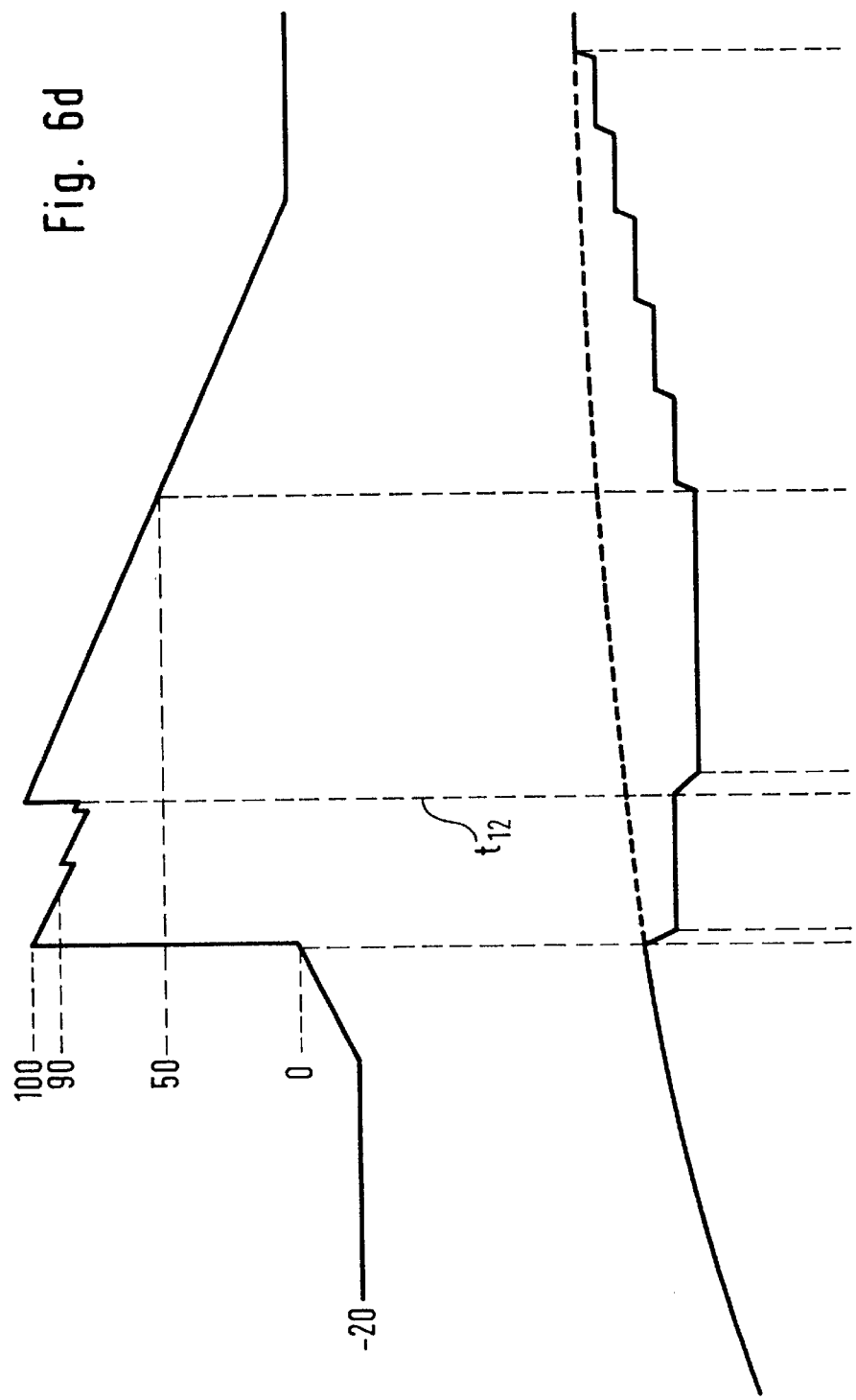

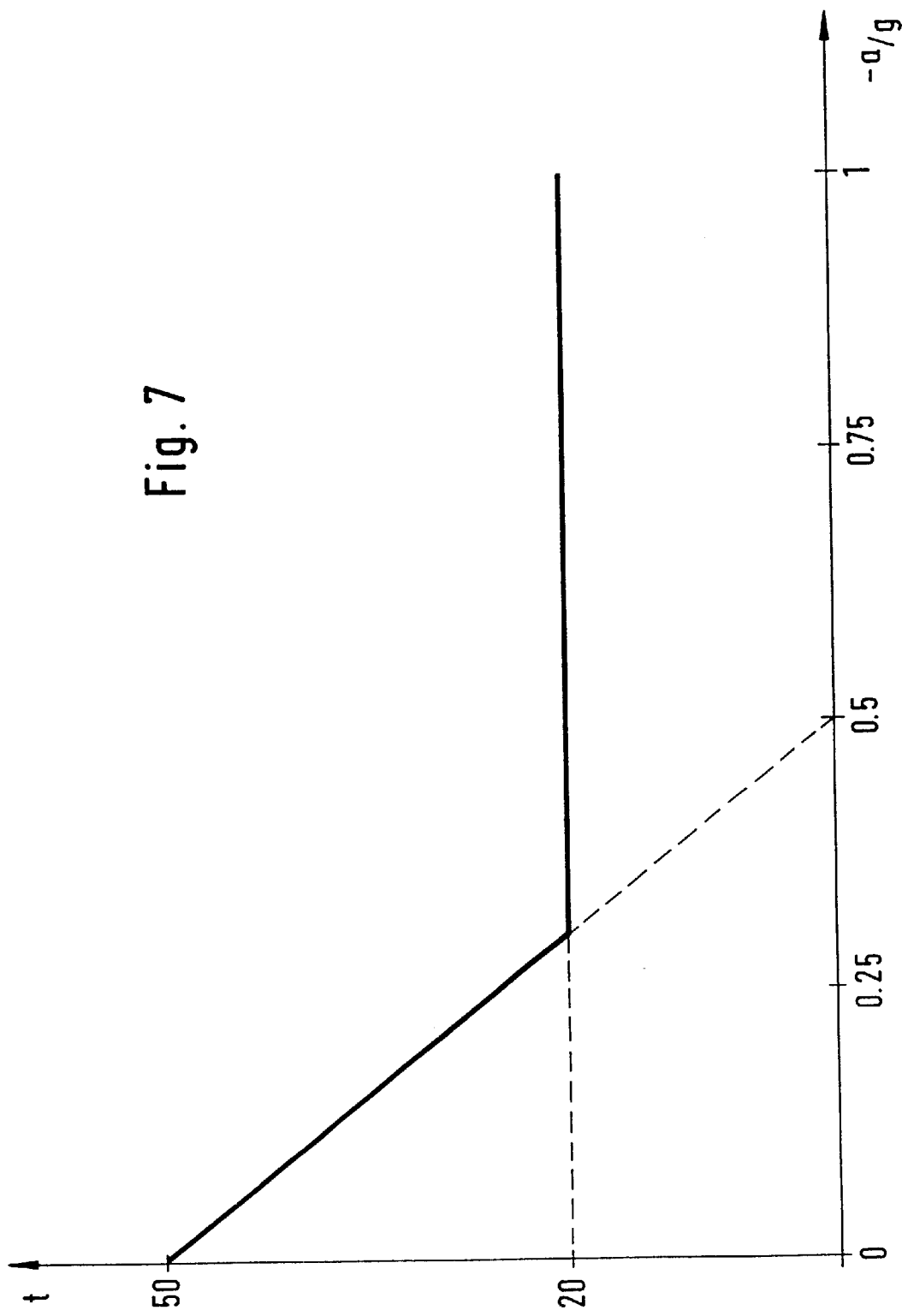

METHOD AND DEVICE FOR DETECTING UNSTABLE BRAKING AND CONTROLLING BRAKING PRESSURE

Partially braked cornering maneuvers present a problem of driving dynamics within the limit range of stability which is not sufficiently under control of conventional anti-lock control systems. Above all, vehicles with a short wheel base tend to suddenly oversteer in such braking situations. Oversteering is often not readily foreseeable by the driver and cannot be easily stabilized in real-life driving situations. FIG. 1a explains the oversteering problem during a partial braking operation. Referring to the FIG. 1, a vehicle 100 moves from the bottom upwards along curve 101 (solid line) Accompanying the cornering maneuver of vehicle 100 is a rotation of the vehicle around its vertical axis. Together with the moment of inertia of the vehicle, this rotation around the vertical axis causes an angular momentum. This angular momentum around the vertical axis must also be braked, together with the braking operation of the vehicle along curve 101. In FIG. 1a, it is assumed that the braking operation of the vehicle along curve 101 comes on in the bottom position illustrated. The braking operation brings about a reduction of the speed v(1) on the circular path 101 and thus, also, a reduction in the speed of the angle of rotation of the vehicle around its vertical axis. The angular momentum, however, causes the vehicle to try to keep up the original rotation around the vertical axis and thus to rotate more strongly than required by the diminishing vehicle speed, thus causing a swing-in tendency. As, within the partial braking range (all wheels applied by the same braking force), this tendency is not counteracted by any countering moment (e.g., due to varying actuation of the brakes) it is impossible to prevent the vehicle from slightly swinging inwards, since the lateral guiding forces of the wheels build up only as forces reacting to the occurrence of the inward swing because of the then increased oblique motion angles. The vehicle thus having reached an increased oblique motion angle $\beta(2)$, there is also an increase in the steering moment on the front axle with the steering wheel position remaining unchanged, and the vehicle steers along a narrowed course. This narrowed course is represented by the broken line 102. This may result in instability and in swinging around the vertical axis if, previously, driving took place within the limit range of stability.

It often happens that ABS comes on too late in a situation as described above. ABS is a wheel-individual type of control with comparatively insensitive threshold values with regard to the respective wheel slip. In FIG. 1a, ABS would come on no sooner than in the top position when the vehicle would already have built up a considerable sideslip angle. However, then, ABS is no longer able to stabilise the vehicle.

It is an object of this invention to provide a method and a device for identifying an unstable braking operation and for controlling the braking pressure within the partial braking range, by means of which it is possible to identify an unstable braking operation or rather to prevent it as far as possible.

This task is solved by the characteristics of the independent claims. Dependent claims are directed to preferred embodiments of this invention.

The inventive identification of an unstable braking operation does not just perform a selective check of the running behaviour of any individual wheel, only. What is done rather is the comparison of the running behaviour of a left-hand side wheel with the running behaviour of a right-hand side wheel and/or there takes place an observation and evaluation of the time variation of the running behaviour of a wheel, preferably on the inside of the corner, over a longer time. On the basis of these critera it is possible to identify an unstable braking operation so as to enable suitable countermeasures to be initiated.

An unstable braking operation such as indicated above being identified, it is possible to initiate as a countermeasure the reduction of braking pressure on at least one wheel on the inside of the corner. This causes the wheel on the outside of the corner to be braked more strongly so that the swing-in moment caused by the angular momentum of the vehicle is counteracted by a swing-out moment caused by the unequal braking forces on the wheels on the inside and outside of the corner. It is thereby possible to prevent swinging-in of the vehicle as shown in FIG. 1a (transition from solid line 101 to broken line 102), the vehicle driving safely along the provided curve 101.

FIG. 1b shows an exemplary partial braking situation in the limit range of the corner where ABS intervention comes on too late. The top graph shows the vehicle speed by means of curve 103 and any wheel speed by means of curve 104. The bottom graph shows the wheel braking pressure by means of curve 105 and, in comparison therewith, the braking pressure in the tandem master cylinder by means of the broken-line curve 106. The wheel slip values being sufficient to activate ABS, the vehicle has already reached a very high sideslip angle. The braking pressure reduction then coming on on all wheels does not bring about any stabilising countermoment as, generally, no big difference develops in the braking force on one axle. If a very high sideslip angle has built up (the beginning of the vehicle's standing obliquely) ABS reduces the wheel braking pressure to almost 0 bar, typically at time T3 of the represented example, without the wheels being able to reaccelerate. This is no earlier possible than when the vehicle has swung by more than 90° around the vertical axis, then skidding (as of time T4). Thus, ABS is not able to prevent the vehicle from swinging in towards the inside of the corner. Wheel-individual anti-lock control is not expedient in this case as slip is only caused by the high oblique motion angles of the wheels, yet not by overbraking. Likewise inexpedient is consequently the effort of counteracting the slip plunge of the wheel by means of pressure reduction; it rather may even be hazardous because the vehicle, then suddenly underbraked after a rotation by more than 90°, may skid along the running direction of the wheels (time T4).

Some embodiments of this invention will be described with reference to the drawings, wherein FIG. 1a is a representation in order to explain the physical background;

FIG. 1b is an exemplary partial braking operation with a conventional brake system;

FIGS. 2a–c are typical variations of wheel speeds and braking pressures;

FIG. 3 is the schematical combinatorial representation of a plurality of inventive embodiments;

Figure 4:
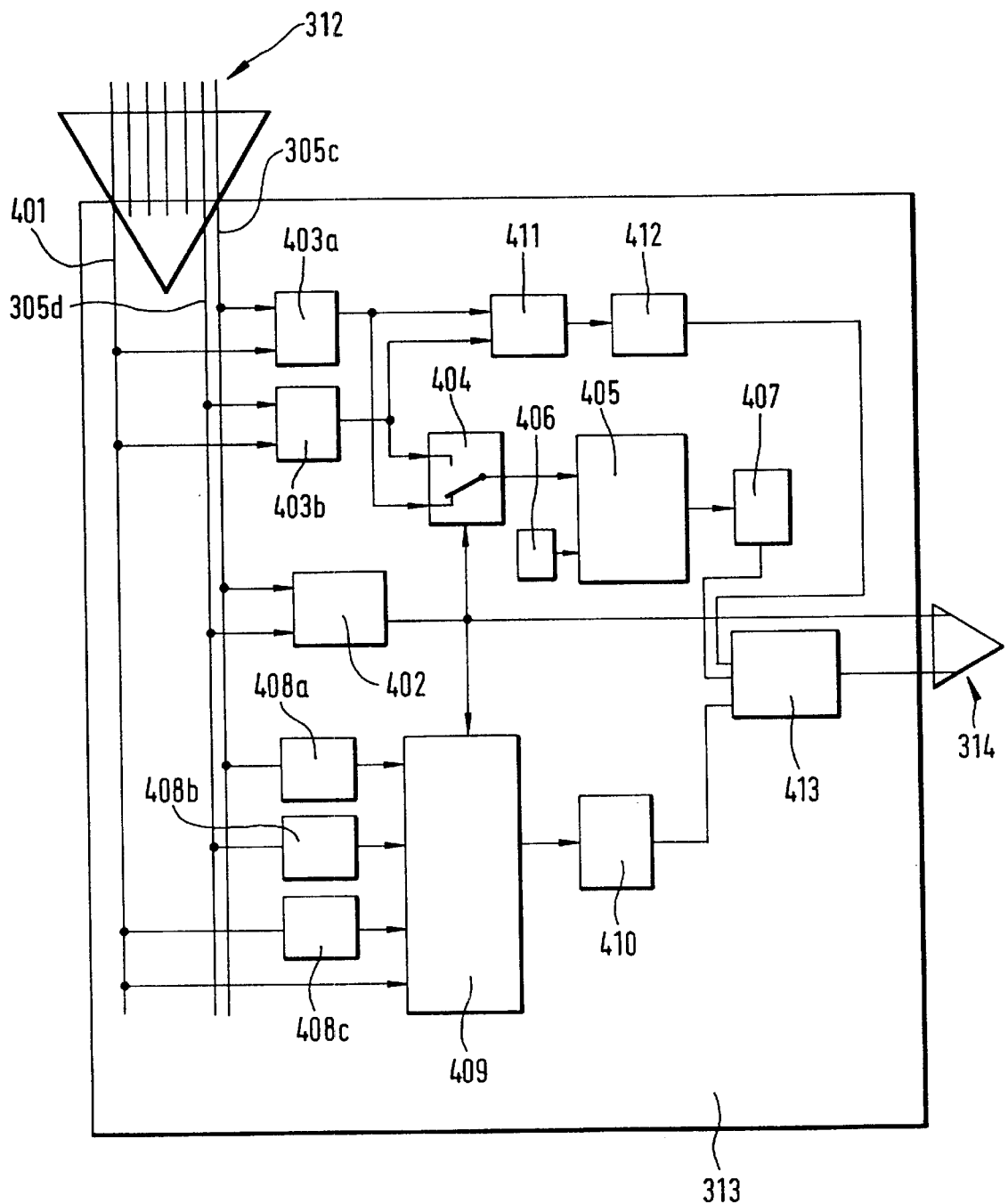
FIG. 4 is a further inventive embodiment.

FIGS. 6a–d are various braking pressure variations; and

FIG. 7 is a deceleration-dependent braking pressure reduction.

FIGS. 2a–c show various typical time variations of wheel speeds, on the one hand, and of braking pressures on the individual wheels, on the other hand. Referring to the Figures, the broken line 200 each time designates the reference speed of the vehicle as detected, e.g., on the basis of wheel sensors and other devices. The curves 201a, b, c and d designate wheel speeds of the individual wheels of the vehicle. 201a relates to the left front wheel, 201b relating to the right front wheel, 201c to the right rear wheel and 201d to the left rear wheel. Thus each time the individual wheel speeds are related to the reference speed of the vehicle (with the dimensioning of one value being adapted to the other (conversion between track speed and angular speed)). The curves 202a–d designate braking pressures on the individual wheels, with the relationship between indices a–d and the wheels of the vehicle being as already mentioned above. The solid lines of these drawings are the actually prevailing wheel braking pressures whereas the broken lines illustrate the pressure in the master cylinder of the brake system.

FIG. 2a is a typical wheel speed pattern of a partially braked oversteering situation of a front-driven vehicle. The wheels (a and d) on the inside of the corner adopt slowly increasing slip values during the application of the brakes, whereas the wheels on the outside (b and c) at first are stable. In particular, the wheels on the outside are practically free from oscillations. The speed variations, rather, are smooth, i.e., the wheel acceleration lies within a narrow band with regard to the acceleration of the vehicle. Referring to the wheels on the inside of the corner, in most. cases the less-loaded wheel features certain oscillating reactions and also, in part, deep slip plunges. This concerns the rear wheel (FIG. 2a, curve 201d) in case of front-driven vehicles whereas in rear-driven vehicles the front wheel (FIG. 2b, curve 201a) is the affected wheel. FIG. 2c represents a maneuver of changing lanes with steering first to the left and then to the right. Consequently, at first, a certain slip forms on the left-hand side wheels (a and d) and, subsequently, on the right-hand side wheels (b and c) which, then, is to disappear.

Curves 202a–d of FIGS. 2a–c represent the inventively modified wheel braking pressures of the respective wheels. Their variation will be discussed later on.

In terms of quality and arrangement, the curves of FIGS. 2b and 2c show the same values as those of FIG. 2a.

FIG. 3 is the combinatorial representation of a plurality of inventive embodiments. Schematically represented at the top is a vehicle where the right-hand side is the front and the left-hand side is the rear of the vehicle. 301a is the left-hand side front wheel, 302a is a corresponding wheel sensor with a signal line 305a. 303a symbolises the wheel brake, 304a a hydraulic control unit, and 306a symbolises a signal feed line to the control unit of the hydraulic system 304a. Analogously, the same arrangements are to be found on the remaining wheels (with indices "b" for the front of the right-hand side, with indices "c" for the rear of the right-hand side, and with indices "d" for the rear of the left-hand side). Axle 310 is the front axle, axle 311 being the rear axle. 313 is the schematical representation of an inventive device for identifying an unstable braking operation. 314 is a bundle of output signals and 315 is a schematical representation of an inventive device for controlling the braking pressure. This device generates signals suitable for actuating the wheel brakes or rather suitably modifies signals already generated. It is, e.g., possible to embed this device in a larger device 317. This device 317 may feature a more comprehensive brake controlling or regulating system 318 which also may include ABS. The identifying device 313 receives a bundle of input signals 312 which, inter alia, may include the signals 305a–d of the wheel sensors 302a–d as well as further signals such as the reference speed $v_{Ref}$ of the vehicle. The signal bundle 314 may likewise include a plurality of signals such as a signal allowing the left-hand side/right-hand side allocation, on the one hand, and the inside/outside-of-the-corner allocation, on the other, a signal indicating the existence of an unstable braking operation, and signals for timing control etc. The output signal bundle 316 may include signal lines relating to the input signals 306a–d of the respective valves 304a–d of the associated wheel brakes 303a–d.

The identifying device 313 identifies an unstable braking operation of a two-track vehicle by either comparing the running behaviour of at least one left-hand side wheel with that of a right-hand side wheel by means of a comparing device and/or by watching and evaluating the time variation of at least one wheel.

A more concrete embodiment of the identifying device 313 is shown in FIG. 4. The identifying device 313, e.g., receives the signals 305a–d of wheel sensors 302a–d via the signal bundle 312, with only signals 305c, d of the rear axle being shown by way of example. 402 is a detecting device for detecting the inside of the corner of the vehicle. For instance, it can compare the wheel speeds of non-driven wheels of one axle (i.e. of the rear axle in case of a front drive) The faster wheel will be on the outside, the slower one on the inside. This is also true in view of the fact that slip plunges are expected. These slip plunges, as a rule, always make their first and stronger appearance on the inside of the corner as the wheels on the outside of the corner are loaded more strongly during cornering because of the rolling moment of the vehicle around the longitudinal axis. So, these wheels on the outside of the corner run on without slip when the less strongly loaded wheels on the inside of the corner already feature slip and thus are slower. Instead of the schematically represented detecting device 402, however, it is also possible, e.g., to provide a steering angle sensor generating a corresponding signal.

A detecting device 403a, b, 408a, b is provided, detecting the slip and/or the acceleration of the watched wheels. 403a, b are slip detecting devices receiving a wheel signal each, on the one hand, and the reference speed 401 of the vehicle, on the other hand. Thence it is possible to detect the slip of a watched wheel (slip being defined as the difference between the wheel speed and the speed of the vehicle so that the slip on its part has the dimension of a speed).

Reference numerals 408a–408c designate acceleration detecting devices detecting the wheel accelerations and the acceleration of the vehicle, respectively, by receiving as input signals the respective wheel signals 305c, d and the speed 401 of the vehicle, thence deriving the respective accelerations. Each of them may include differentiators.

Oscillations in a wheel speed may point to unstable conditions; see, e.g., curve 201a in FIG. 2b. Such oscillations, e.g., may be detected by watching the wheel accelerations and by checking whether these accelerations lie within a certain band around the acceleration of the vehicle. It is not selective values that are preferably used for this decision but rather variations are watched over a longer period. Typical oscillation frequencies of the slip lie around 10 cycles so that observation periods may lie within the range of between 10 and 300 msec., preferably between 100 and 200 msec. If during such a time window significant deviations are noticed between a wheel acceleration and an acceleration of the vehicle, e.g., on the basis of one or a plurality of excursions from a data range around the acceleration of the vehicle it can be decided that a braking operation is unstable. 411 is a third comparing device which can be provided in addition to the first comparing device 409 or instead thereof. It directly compares slip values of wheels with each other, with the slip of a left-hand side wheel being compared with the slip of a right-hand side wheel, preferably of the same axle. If these values differ from each other by a certain amount, and in particular if the slip of the wheel on the inside of the corner is clearly above the slip of the wheel on the outside of the corner, it can be concluded that a braking operation is unstable. In this case it is also possible to watch the time variation via unit 412.

Figure 5:
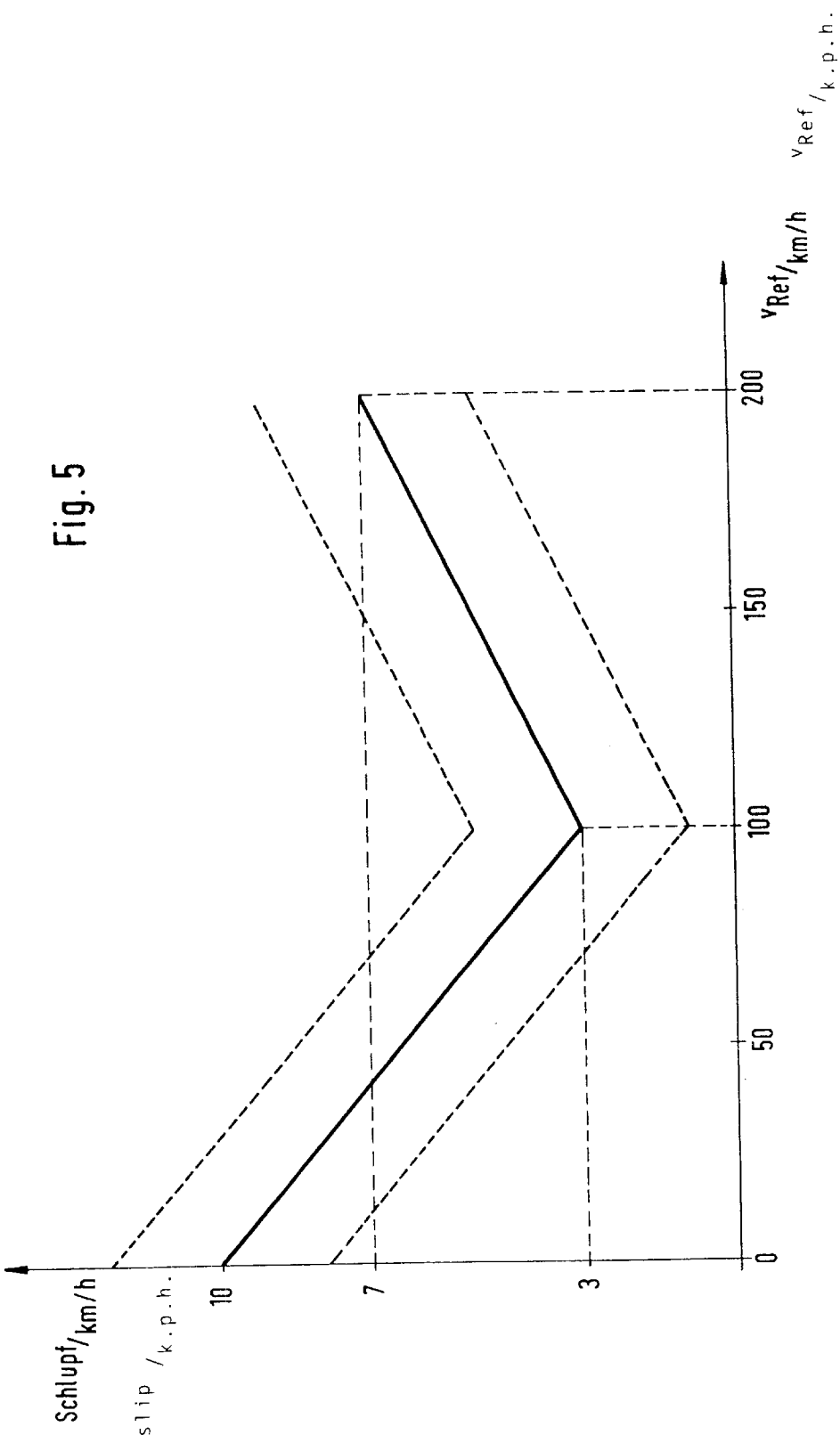
FIG. 5 shows speed-dependent slip threshold values.

FIG. 5 shows by way of example how slip threshold values can be selected by the determining device 406 in dependence on the reference speed of the vehicle. In order to optimise the responding sensitivity it is desirable to determine the slip threshold values used for the decision so that, in case of medium speeds (between 80 and 120 k.p.h., preferably round about 100 k.p.h.), they are at their minimum and ascend linearly to the right and left thereof. In accordance with further conditions it is possible to select different curves, e.g., curves 501, 502 or 503. The curves show that a slip of between approximately 1 and 6%, and preferably of approximately 3%, is admissible in case of a minimum (i.e., around approximately 100 k.p.h.).

The abovementioned options can be provided individually and apart from each other or in combination with each other. The actual decision on whether there is an unstable braking operation is performed by the identifying device 413. It receives the individual signals, linking them to form an output signal, if necessary in accordance with further input signals. This output signal provides the information on whether there is an unstable braking operation.

For instance, if a critical braking operation was identified as described above there may be an intervention in the brake system to the effect as to generate a moment counteracting the swing-in tendency. This may happen in that a braking force is generated on the outside of the corner which is stronger than that on the inside. This may be done in that the braking pressure is increased on the outside of the corner or is reduced on the inside of the corner. The latter may be given the preference as it may altogether be expedient to reduce the braking forces in a critical braking situation instead of increasing them. Consequently, the braking pressure would have to be reduced on the inside of the corner. Thus, a braking force forms on the inside of the corner which is smaller than that on the outside of the corner. This results in a torque acting towards the outside of the corner and counteracting the corner-inwards-acting moment of inertia of the braked vehicle, thus having an altogether stabilising effect.

FIG. 5 shows by way of example how slip threshold values can be selected by the determining device 406 in dependence on the reference speed of the vehicle. In order to optimise the responding sensitivity it is desirable to determine the slip threshold values used for the decision so that, in case of medium speeds (between 80 and 120 k.p.h., preferably round about 100 k.p.h.), they are at their minimum and ascend monotonously to the right and left thereof. In accordance with further conditions it is possible to select different curves, e.g., curves 501, 502 or 503. The curves show that a slip of between approximately 1 and 6%, and preferably of approximately 3%, is admissible in case of a minimum (i.e., around approximately 100 k.p.h.).

The lower curves of FIGS. 6*a–d* each time show braking pressures modified by an inventive method for controlling the braking pressure in response to the identification of a critical braking situation (solid line) as compared with the value which would have been generated without modification (broken line 602) by the other braking control/regulation unit (such as 318). Line 603 shows the counter reading of a counter used for controlling the time conditions for identification and pressure control.

Identification of the critical braking operation takes place in the period 604 ($t_1$–$t_2$). This situation being identified ($t_2$), the braking pressure is reduced on one wheel on the inside of the corner. Then the pressure drops within the period 605 ($t_2$–$t_3$) and is kept constant for a determined or determinable period (period 606, $t_3$–$t_4$). Thereupon (period 607, $t_4$–$t_5$), the pressure is built up again step by step until reaching the value without modification (time $t_5$). The period of keeping the pressure on the reduced value, however, can also be determined by the counter reading 603 of the abovementioned counter. An embodiment is shown where at the beginning of the reduction the counter is set to 100, then a countdown following, with gradual rebuild-up of the braking pressure starting at the value of 50. The period for identifying is determined by a count-up procedure of the counter from –20 to 0.

It is possible to check the slip behaviour of the wheel for as long as pressure reduction takes place. Specifically, it is possible to check whether the slip diminishes which, a priori, may be expected after a braking pressure reduction. If the slip does not diminish it is possible to extend the duration of pressure reduction. This is shown in FIG. 6*b*. There, it is assumed that no slip reduction or only an insufficient one could be noticed (at each of times $t_6$, $t_7$, $t_8$, $t_9$ and $t_{10}$). At each of these times it is decided that the duration of keeping the braking pressure reduced is to be modified. In the embodiment shown, this may happen, e.g., in that the counter reading is each time reset somewhat to a higher value so that it takes more time for the countdown to reach the threshold value of 50. At time $t_4'$, finally, the threshold value is reached, the pressure build-up phase 607 starting as in FIG. 6*a*.

Figure 6C:
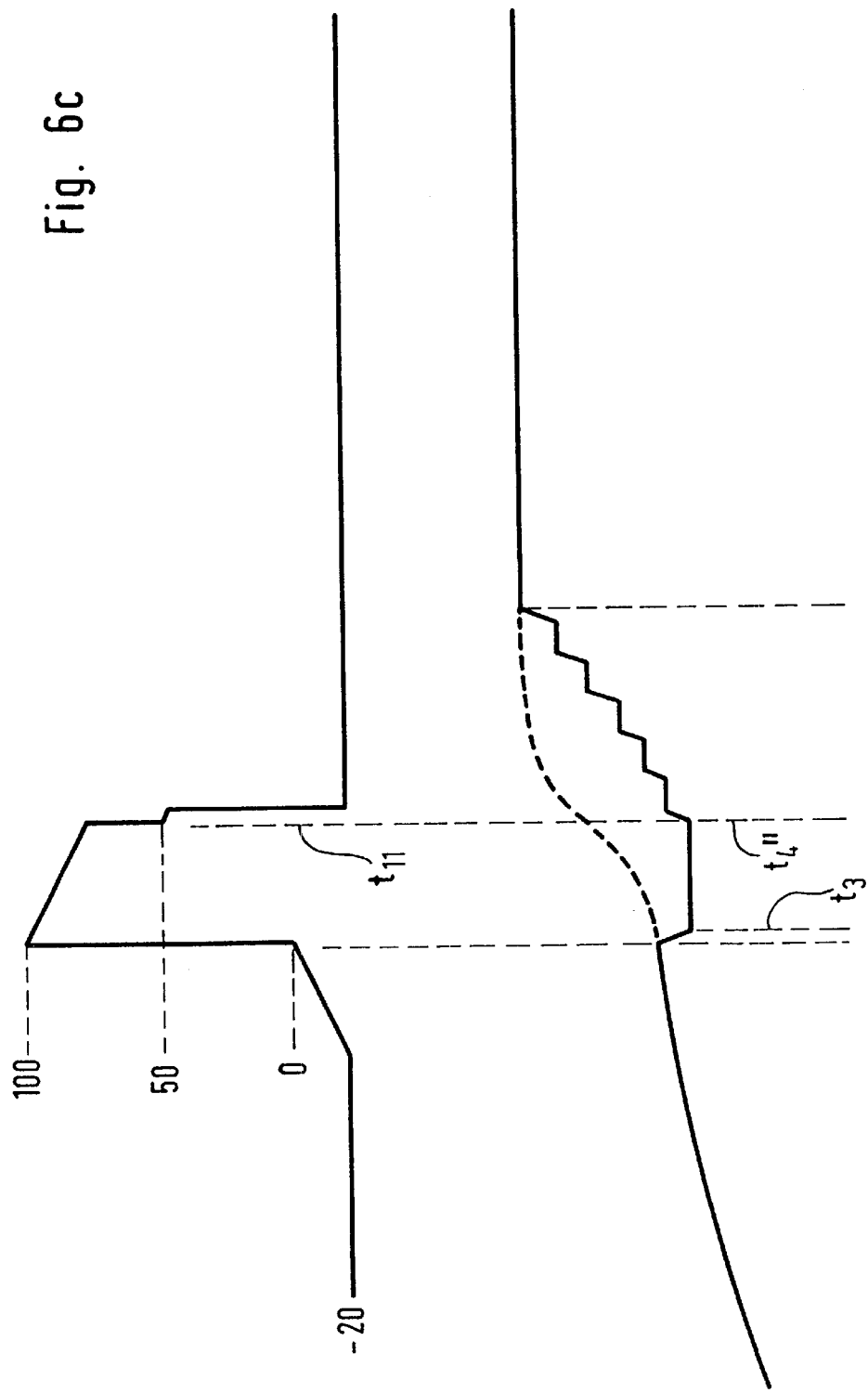

FIG. 6*c* shows a case where it is noticed at time $t_{11}$, that the slip has diminished so clearly that the new pressure build-up may start at once. Then, it is possible to reduce or cut off the phase of keeping the braking pressure reduced, e.g., by setting the counter reading to the threshold value sampled for the decision on the new pressure build-up or (depending on the sampling) by completely resetting it. Then, the new step-wise pressure build-up already starts earlier. In FIG. 6*c*, this is the case as of time $t_4''$.

FIG. 6*d*, at last, shows the case where the result of the wheel slip check during the phase of keeping the braking pressure reduced is that the slip does not decrease as desired or rather is even on the increase (sampling at time $t_{12}$). Then, a new pressure reduction may take place, with the braking pressure again being reduced. Thereupon, the same options follow as described with reference to FIGS. 6*a–c*.

FIG. 7 shows a graph indirectly representing the pressure reduction as a function of the reference deceleration of the vehicle. Directly represented is the actuating time of the outlet valve of the wheel brake, with the actuating time in first approximation being proportional to the pressure reduction. Moreover, a smaller reference deceleration of the vehicle leads to a smaller pressure being metered into the wheel brakes so that an extended valve actuation is required for a pressure reduction by a certain amount due to the volume-to-pressure characteristic line of the brake and the characteristic of the operating valves.

The above-described identification of a critical braking operation does not require any additional sensors. It evaluates the signals (e.g., pulsating signals) of the wheel sensors 302*a–d*. This is an advantage because there is no need to put up with either new sensors or new wiring. Identification may be implemented by means of additions in the control unit, only. In order to trigger the inventive braking pressure control, however, it is not a must to implement the described identification of a critical braking operation by means of the embodiment described. Other embodiments are also possible, e.g., via sensors of its own.

Some additional individual variants of this invention will be described in the following.

In identifying a critical braking operation one can expect the critical wheel signals each time on the less loaded wheel(s) on the inside of the corner. Consequently, it is the mentioned wheels which in each case are expediently monitored in order to identify the critical braking situation.

The above-mentioned identification of a critical braking operation or rather the then ensuing braking pressure control relates to the partial braking range, i.e., to that range wherein ABS does not yet intervene and the braking pressures (without modification) are the same on all wheels. Should the slip behaviour of one individual wheel be such as to cause ABS to come on the inventive method can be cut off; then, ABS only is to control the braking pressures of the individual wheels.

In front-driven vehicles, moreover, nowadays generally an electronic braking force distribution control system is used which distributes the braking force between front axle and rear axle also within the partial braking range so that even within the partial braking range the braking pressures are not the same on all wheels. In the here considered extreme cornering situations the electronic braking force distribution normally comes on even before the inventive method and already has a stabilising effect with its rather strongly dimensioned pressure reductions. However, practice shows that the electronic braking force distribution between front and rear axles, alone, is not sufficient to stabilise the vehicle in a truly critical cornering situation. In front-driven vehicles, it is thus expedient to activate both components, namely the electronic braking force distribution between front and rear axles and the inventive braking pressure control method (ultimately a braking force distribution between the inside and outside of the corner).

The described braking pressure control may also make use of components of the anti-lock control system such as of signal inputs or signal outputs.

What is claimed is:

1. A device for controlling the braking pressure of an inside cornering wheel during a critical braking operation of a vehicle during cornering, comprising:
    an identifying device for identifying an unstable braking operation of the vehicle during cornering,
    a detecting device for detecting an inside cornering wheel based on the speeds of a non-driven left-hand side wheel and of a non-driven right-hand side wheel; and
    a reducing device for reducing the braking pressure on the inside cornering wheel until a slip of the inside cornering wheel falls below a slip threshold value.

2. The device according to claim 1, wherein the reducing device selects an amount of reduction of braking pressure by evaluating one of an acceleration and a deceleration of the vehicle.

3. The device according to claim 1, wherein the reducing device increases the braking pressure of the inside cornering wheel after the slip of the inside cornering wheel falls below the slip threshold value.

4. A method for maintaining stability of a vehicle during cornering, comprising the steps of:
    detecting a wheel speed of an inside cornering wheel and a wheel speed of an outside cornering wheel,
    comparing the wheel speed of the inside cornering wheel with the wheel speed of the outside cornering wheel,
    identifying an unstable-braking operation based on the comparing step when the wheel speed for the inside cornering wheel and the wheel speed for the outside cornering wheel differ from each other in accordance with a predetermined pattern over a predetermined period of time,
    whereby a braking pressure is reduced in the inside cornering wheel to maintain stability of the vehicle during cornering until a slip of the inside cornering wheel falls below a slip threshold value.

5. The method according to claim 4, wherein the slip threshold value is determined based on a speed of the vehicle.

6. The method according to claim 4, wherein the unstable braking operation is identified as a variation of the slip of the inside cornering wheel over a period of time.

7. The method according to claim 4, wherein the inside cornering wheel for stabilizing the vehicle is determined based on wheel speeds of a non-driven left-hand side wheel and a non-driven right-hand side wheel.

8. The method according to claim 4, wherein the inside cornering wheel for stabilizng the vehicle is determined based on wheel speeds of the rear axle wheels.

9. The method according to claim 4, wherein the detecting step is implemented when vehicle brakes are partially applied and is not implemented when vehicle brakes are fully applied.

10. A method of controlling the braking pressure of an inside cornering wheel during a critical braking operation of a vehicle during cornering, comprising the steps of:
    identifying an unstable braking operation of the vehicle during cornering,
    determining an inside cornering wheel based on the speeds of a non-driven left-hand side wheel and of a non-driven right-hand side wheel;
    reducing the braking pressure on the inside cornering wheel; and
    maintaining the reduction in braking pressure on the inside cornering wheel until a slip of the inside cornering wheel falls below a slip threshold value.

11. The method according to claim 10, wherein an amount of reduction of braking pressure is determined by evaluating one of an acceleration and a deceleration of the vehicle.

12. The method according to claim 10, wherein the reduction in braking pressure on the inside cornering wheel is increased after the slip of the inside cornering wheel falls below the slip threshold value.

13. A device for maintaining stability of a vehicle during cornering, comprising:
    a detecting device for detecting a wheel speed of an inside cornering wheel and a wheel speed of an outside cornering wheel;
    a first comparing device for comparing the wheel speed of the inside cornering wheel with the wheel speed of the outside cornering wheel; and
    an identifying device for identifying an unstable braking operation based on the output of the comparing device when the wheel speed for the inside cornering wheel and the wheel speed for the outside cornering wheel differ from each other in accordance with a predetermined pattern over a predetermined period of time,
    wherein a braking pressure is reduced in the inside cornering wheel to maintain stability of the vehicle during cornering until a slip of the inside cornering wheel of the inside cornering wheel falls below a slip threshold value.

14. The device according to claim 13, wherein the detecting device detects one of a wheel speed, a slip, and an acceleration.

15. The device according to claim 14, further including a second comparing device for comparing a slip threshold value with the slip.

16. The device according to claim 15, further including a determining device for determining the threshold slip value based on a speed of the vehicle.

17. The device according to claim 14, wherein the unstable braking operation is identified as a variation of the slip of the inside cornering wheel over a period of time.

18. The device according to claim 13, wherein the unstable braking operation is identified based on a signal of a non-driven left-hand side wheel and a non-driven right-hand side wheel.

19. The device according to claim 13, wherein the unstable braking operation is identified based on a speed of the rear axle wheels.

20. The device according to claim 13, wherein the detecting device detects the operating parameter when vehicle brakes are partially applied and is not implemented when vehicle brakes are fully applied.

* * * * *

UNITED STATES PATENT AND TRADEMARK OFFICE
CERTIFICATE OF CORRECTION

PATENT NO. : 6,435,627 B1
DATED : August 20, 2002
INVENTOR(S) : Georg Roll et al.

It is certified that error appears in the above-identified patent and that said Letters Patent is hereby corrected as shown below:

<u>Column 8,</u>
Line 1, change "unstable-braking operation" to -- unstable braking operation --.
Line 22, change "wheel for stabilizng" to -- wheel for stabilizing --.

Signed and Sealed this

Eighteenth Day of February, 2003

JAMES E. ROGAN
*Director of the United States Patent and Trademark Office*